United States Statutory Invention Registration [19]

[11] Reg. Number: H879

Vernon et al. [43] Published: Jan. 1, 1991

[54] METHOD AND DEVICE FOR INSPECTING CIRCUMFERENTIALLY CONDUCTING MATERIALS

[75] Inventors: Susan N. Vernon, Annandale, Va.; Stephen S. Lane, Bethesda, Md.

[73] Assignee: The United States of America as represented by the Secretary of the Navy, Washington, D.C.

[21] Appl. No.: 374,212

[22] Filed: Jun. 30, 1989

[51] Int. Cl.[5] ..... G01N 27/82

[52] U.S. Cl. ..... 324/240; 324/232; 324/241; 324/242

[58] Field of Search ..... 324/232, 235, 238, 240–242

[56] References Cited

U.S. PATENT DOCUMENTS

| | | | |
|---|---|---|---|
| 2,124,579 | 7/1938 | Knerr et al. | 324/242 X |
| 2,150,922 | 3/1939 | Hay | 324/241 X |
| 3,449,664 | 6/1969 | Smith | 324/235 |
| 3,694,740 | 9/1972 | Bergstrand | 324/235 X |
| 4,006,407 | 2/1977 | Flaherty et al. | 324/233 |
| 4,041,379 | 8/1977 | Karlsson | 324/260 |
| 4,107,605 | 8/1978 | Hudgell | 324/220 |
| 4,337,431 | 6/1982 | Hale | 324/220 |
| 4,413,231 | 11/1983 | Amedro et al. | 324/220 |
| 4,467,281 | 8/1984 | Davis et al. | 324/237 |
| 4,495,587 | 10/1982 | Toth et al. | 324/237 |
| 4,496,904 | 1/1985 | Harrison | 324/227 |
| 4,507,608 | 3/1985 | Flach et al. | 324/237 |
| 4,667,149 | 5/1987 | Cohen et al. | 324/64 |
| 4,719,422 | 1/1988 | deWalle et al. | 324/238 |
| 4,739,261 | 4/1988 | Sugiyama et al. | 324/232 |
| 4,745,809 | 5/1988 | Collins et al. | 73/661 |
| 4,747,310 | 5/1988 | Collins et al. | 73/661 |
| 4,761,610 | 8/1988 | Svegander et al. | 324/237 |
| 4,763,071 | 8/1988 | McGee et al. | 324/236 |
| 4,821,204 | 4/1989 | Huschelrath | 324/237 |
| 4,823,082 | 4/1989 | Nasu et al. | 324/225 |

FOREIGN PATENT DOCUMENTS

| | | | |
|---|---|---|---|
| 86/01896 | 3/1986 | World Int. Prop. O. | 324/238 |
| 86/02456 | 4/1986 | World Int. Prop. O. | 324/237 |

*Primary Examiner*—Thomas H. Tarcza
*Assistant Examiner*—Linda J. Wallace
*Attorney, Agent, or Firm*—John D. Lewis; Kenneth E. Walden

[57] ABSTRACT

A device for inspection by eddy current methods of materials exhibiting circumferential conductivity. This device finds application for the inspection of filament-wound carbon fiber reinforced composites which do not usually have sufficient conductivity in the axial direction to allow inspection by conventional surface probes while still providing the desired resolution. This device is also useful in inspecting thick-walled circumferentially conductive materials, including metal, where their thickness would require a surface probe of such diameter as to be impractical.

10 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

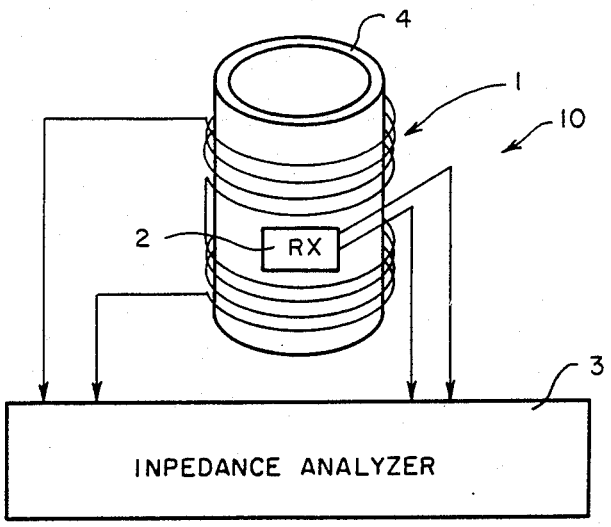
FIG. 1
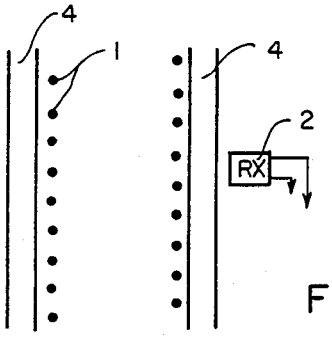
FIG. 2a
FIG. 2c
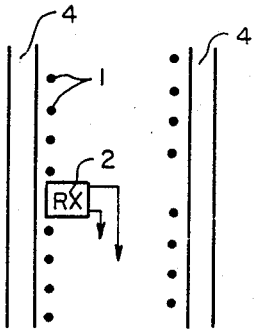
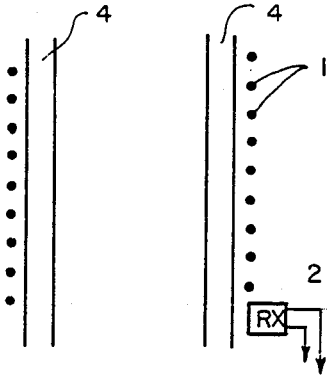
FIG. 2b
FIG. 2d
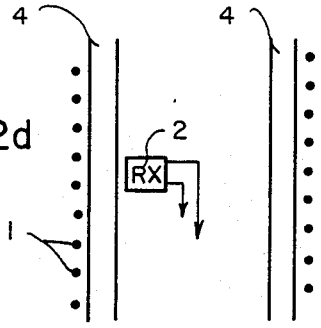
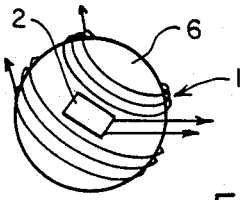
FIG. 3

METHOD AND DEVICE FOR INSPECTING CIRCUMFERENTIALLY CONDUCTING MATERIALS

The U.S. Government has rights in this invention pursuant to Contract N65030-87-C-0177.

BACKGROUND OF THE INVENTION

With the growing application of filament-wound conductive fiber reinforced composites, particularly in aerospace, there is an increasing demand for nondestructive methods to detect and measure fiber anomalies such as service-incurred broken fibers and fabrication-related variations in fiber volume fraction or fiber density. Eddy current technology is ideally suited to these tasks since it is the conductive fibers which carry most of the current (carbon-carbons) or all of the current (graphite epoxies).

Eddy current transducers may be used alone or in various combinations. A particular transducer may be both the transmitter and the receiver if the transducer is operating in the reflection mode. When two or more are used, one or more may be a transmitter and have applied to it an alternating current or an alternating voltage. One or more of the others then functions as a receiver or pick-up coil. In this case the transmitter(s)-/receiver(s) combination may function in the reflection mode, where both transmitter and receiver are on the same surface of the workpiece, or they may function in the through-transmission mode with the transmitter(s) on one surface and the receiver(s) on the opposite surface.

Common transducers are: (1) encircling coils which are wrapped around either the outer or the inner circumference of the workpiece; and (2) surface probes which generally are flat (pancake) coils used to inspect relatively flat surfaces. Surface probes may also have other forms, usually identified by the shape of the ferrite core placed within the coil. These include pot cores, E cores, and U cores.

The through transmission mode is typically used to inspect thin metal foils or sheets. Two pancake coils are mounted on the tines of a fork and the workpiece is passed between the coils. The combination of encircling coils on the outer and inner surfaces of a tube or cylinder are also used in the through-transmission mode. Encircling coils, in either mode, are typically used to inspect tubing having diameters on the order of inches or less. They are sensitive to cracks running in the axial direction and can locate a defect axially, but they provide no circumferential resolution. When large diameter tubes and cylinders are inspected by eddy current methods, surface probes are generally used for the axial and circumferential defect resolution they provide.

The inspection of filament-wound conducting fiber reinforced composites by eddy current methods poses a special problem. Structures of these materials typically have large diameters, on the order of feet rather than inches, and it is desirable to locate both the axial and circumferential position of detected defects. Both the structure size and the desired resolution suggest the use of surface probes which are used in the inspection of large diameter metal structures. However, surface probes require the presence in the workpiece of conducting paths which generally, if not exactly, image the current flowing in the eddy current coil. This requires that the test material possess conductivity in all directions in planes parallel to the surface. Yet filament-wound conductive fiber reinforced composites often provide conductive paths primarily in the circumferential direction—the general direction in which the conducting fibers are wound. Consequently, surface probes are ineffectual in the inspection of such structures. Encircling coils require conductivity only in the circumferential direction and so could be used with filament-wound conductive fiber reinforced composites. However, these coils provide no defect resolution in the circumferential direction. The invention addresses the problem posed by limited conduction paths in directions other than the circumferential and by the desire for circumferential resolution of defects.

Probe coils are effective in the eddy current inspection of large diameter metal structures. If back surface defects are to be detected, the eddy currents must fully penetrate the material under test. However, the diameter of the coil required to drive the field (and eddy currents) through the wall to the back surface of the workpiece is proportional to the thickness of the wall to be penetrated. On the other hand, large probes lead to poor spatial resolution in both axial and circumferential directions. Therefore conventional eddy current inspection systems cannot provide both high sensitivity and good resolution in thick sections.

An example of the current state of the art is Smith, U.S. Pat. No. 3,449,664, filed June 10, 1969. A transmitter/receiver combination is used to inspect conductive materials by eddy current methods. The transmitter is a pancake or probe coil and the receiver is a semiconductor device. The probe coil would not always induce eddy currents in filament-wound conductive fiber reinforced composites for reasons discussed above and so could not be used to replace the transmitter in the invention. The semiconducting device used as a receiver might work as well with the encircling coil transmitter as does the horseshoe receiver herein described, although different electronics would be required. This prior art suffers from the same shortcomings in the inspection of thick-wall metal structures as does any eddy current method utilizing probe coils.

Collins, et al., U.S. Pat. No. 4,747,310, filed May 31, 1988, and Collins, et al, U.S. Pat. No. 4,747,809, filed May 24, 1988, both provide probe coils for the eddy current inspection of composites. For the reasons discussed above, these probe coils would not always induce eddy current flow in filament-wound conductive fiber reinforced composites. In addition, the problems associated with thick-walled structures discussed above also apply.

Axisymmetric surface probe coils are useful in the eddy current inspection of semi-isotropic conductive fiber reinforced composite panels. For example, application Ser. No. 294,622 filed Jan. 9th, 1989 by Vernon et al., entitled "Method and Device for Measuring Resistivity" teaches methods and a device of eddy current inspection for estimating the electrical resistivity of materials. While the method applies to all materials with an approximate relative magnetic permeability of 1, it is particularly useful when the test material falls in one or more of the three categories: (1) the resistivity falls within a range for which there are no calibration standards; (2) only one surface of the test material is accessible; and (3) the resistivity is frequency dependent and must be determined over a particular range of frequencies. It is considered an advantage of this prior art invention to measure resistivity without electrical contact with the material under test, such as when the material is covered by a protective coating.

Another prior art reference filed by Vernon et al. on Jan. 9th, 1989 entitled "Method of Eddy Current Defect Depth Measurements", Ser. No. 294,621 is particularly useful for estimating the distance between the scanned surface and a subsurface defect of unknown geometry in electrically conductive materials. This device and its methods is particularly useful in measuring the depth of broken fiber damage such as may result from impact. Neither of these prior art applications, filed by Vernon et al., are capable of functioning on filament-wound conductive fiber reinforced composites because these materials generally lack sufficient conductivity in the axial direction. If they could be used for inspection of filament-wound structures, such as cylinders, cones and spheres, they would provide information on the axial and circumferential location of fiber anomalies, and through-thickness information about broken fiber damage. However, such probes require that a test material provide conductive paths in both the circumferential and axial directions. Filament-wound components, even when there are some fibers in the axial direction, do not always have sufficient conductivity in the axial direction to allow the use of axisymmetric surface probes.

SUMMARY OF THE INVENTION

Applicants' device comprises a transmitter encircling coil which may be wrapped around either the inner or outer surfaces of the workpiece and a discrete receiver. As used herein, discrete receiver means a receiver localized in both the circumferential and axial directions. It is distinguished from a circumferential receiver which is not localized in the circumferential direction. This circumferentially wound transmitter induces eddy current flow in the circumferential direction in the workpiece. To detect localized variations in eddy current flow caused by the presence of a defect, a coil wrapped around a U-shaped core may be used as the receiver (horseshoe probe). The receiver may be on either the same surface as the transmitter (reflection mode) or on the opposite surface (through-transmission mode).

Use of an encircling coil, or coils, as transmitter and receiver to inspect filament-wound conductive fiber reinforced composites is possible, but of little use for two reasons: (1) no circumferential resolution is provided, and (2) there is little sensitivity to defects because their effects are averaged over the circumference of the encircling coil. Combining an encircling transmitter with the discrete receiver is a noval solution to the problems posed by conduction paths limited primarily to the circumferential direction and by the requirement for circumferential resolution of defects.

The device also addresses the problem of thick-wall structures, providing the structure is conductive in the circumferential direction. (It is not necessary that conduction be limited to this direction.) The encircling coil, induces eddy currents through the thickness of the wall and the small discrete receiver detects localized variations in eddy currents. This arrangement provides a higher degree of axial and circumferential resolution than would be possible with the prior art.

The hereindisclosed device allows the inspection of filament-wound conductive fiber reinforced composites by eddy current techniques in those cases where axial fibers, if any, impart inadequate axial conductivity, such as many pressure vessels, rocket nozzles, and other specialized applications. These specialized structures are expensive and often subject to manufacturing defects which place a premium on inspection techniques that ensure reliability. These applications also often engender impact or trauma damage which is difficult to detect with prior art eddy current techniques.

Therefore, it is an object of the present invention to provide a device for the inspection of conductive fiber reinforced composite filament-wound structures by eddy current techniques.

It is another object of the present invention to teach a system of eddy current inspection that is efficient for use when inspecting filament-wound conductive fiber reinforced composite structures.

It is further object of this invention to provide an eddy current transmitter and receiver to inspect any structure wherein there are electrical conduction paths in the circumferential direction.

It is another object of this invention to provide an eddy current system which can locate far-side defects in thick-walled metal structures having circumferential conduction paths.

It is also an object of this invention to provide a means of eddy current inspection which can locate a fiber anomaly both axially and circumferentially.

It is still another object to teach a method of eddy current inspection which can locate anomalies both axially and circumferentially in thick-walled metal structures.

It is another object of this invention to provide a device for eddy current inspection which can be used in the through-transmission mode when both inner and outer surfaces of the test material are accessible.

It is a further object of this invention to provide an eddy current device which can be used when only one surface of the test material is accessible.

It is another object of this invention to teach a device for inspecting filament-wound conductive fiber reinforced composite structures that can be automated via computer controlled scanning devices.

It is yet another object of this invention to teach a device for inspection by eddy current methods which can be used with off-the-shelf impedance measuring devices.

It is yet another object of this invention to teach a device for eddy current inspection of thick-walled metal structures that can locate defects both axially and circumferentially.

These and other objects and novel features of the invention are accomplished by a device which uses a circumferentially wound transmitting coil which induces eddy current flow in the test structure. A pick-up coil or other discrete receiver then detects this eddy current flow from which material properties may be discerned or defects detected.

Other features of this invention will appear from a reading of the detailed description of the invention when considered in conjunction with the accompanying drawings.

BRIEF DESCRIPTION OF THE DRAWINGS

FIG. 1 is a schematic of one embodiment of the eddy current device of the present invention.

FIGS. *2a–2d* are a cross-sectional view of the device of FIG. 1 illustrating various part arrangements.

FIG. 3 is the device of FIG. 1 shown in an arrangement capable of testing of an ellipsoidal workpiece.

DETAILED DESCRIPTION OF THE INVENTION

Turning now to FIG. 1, the numeral 10 designates generally the inspection device of the present invention. Therein, an impedance analyzer 3 is shown in electrical connection with a driver coil shown encircling a test material 4. A discrete receiver 2 is shown in electrical connection with the impedance analyzer 3. While both the discrete receiver 2 and driver coil 1 are shown in FIG. 1 as physically located on the outside of the workpiece, the device will work with the driver coiled within the test material 4 and the pick-up may be located on the inner or outer surface of test material 4. In any of these permutations it is simply necessary that the driver 1 generate circumferential eddy currents in the test material while the receiver 2 responds to the local value of the eddy currents. Any anomaly in the electromagnetic properties of the workpiece 4 will result in a corresponding anomaly in the voltage recorded by receiver 2. This permits defect resolution circumferentially as well as axially in the material under test.

Impedance analyzer 3 may be any instrument which has the capability to generate an alternating current voltage to cause driver coil 1 to induce eddy currents in workpiece 4 along with the means to measure and display the output of receiver 2. In the preferred embodiment this analyzer will have a multiple, selectable frequency capability and be able to output multiple or single frequencies in continuous wave (CW) or pulsed operation.

Driver coil 1 is any coil which couples closely with the test material. The driver coil 1, as shown in FIG. 1, is wound in two parts to allow physical placement of receiver 2 between the two sections. This physical arrangement is considered the preferred embodiment when the transmitter and receiver are on the same surface, but it should be understood that any physical arrangement whereby a driver coil induces eddy currents in a circumferential direction in a test material, and a receiver or receivers detect changes in these eddy currents, is within the scope of applicants invention. Should the driver 1 and the receiver 2 be operated on opposite sides of the test material, no such gap in coil 1 would be required.

The receiver 2 may be a Hall probe, a superconducting quantum interference device (SQUID) or most simply a U-shaped ferrite probe. The receiver 2 used by applicants in the preferred embodiment actually reduced to practice was a U-shaped ferrite core (horseshoe probe) with a plurality of turns of wire wrapped about it. A novel feature of device 10 is the ability of receiver 2 to resolve defects in both the axial and circumferential directions.

FIG. 2*a*–2*d* is a four-part sectional drawing showing the different placement geometries most common in the practice of Applicants' invention. Therein FIG. 2*a* shows a configuration where the driver coil 1 is physically located along the inner surface of a circumferentially constructed test material 4 and the receiver 2 is located on the external surface of the test material.

FIG. 2*b* shows both driver coil 1 and receiver 2 located on the external surface of the test material, but adjacent to and not within the coils of driver 1 as shown in FIG. 1.

FIG. 2*c* shows both driver 1 and pick-up 2 on the inside of the test material while FIG. 2*d* shows the receiver 2 on the inside and driver 1 on the outside.

FIG. 3 shows the possible parts placement of the driver coils 1 and receiver 2 when inspecting an ellipsoidal workpiece such as ultra-high pressure containment vessels. The ability to inspect thick-walled spherical tanks where access is restricted to the outside surface is one of the many features of Applicants' invention. By rotating the workpiece or the driver coil 1, or both, the entire surface of the ellipsoid can be inspected.

In especially large test objects, such as submersibles, the turns comprising the coil of the driver can be manufactured in plug-in belts and connected one turn at a time to construct the driver coil.

Modifications and variations of the invention are possible in light of the above teachings and within the purview of the appended claims without departing from the spirit and scope of the invention.

What is claimed is:

1. A system for inspection by eddy current methods for use on a workpiece exhibiting circumferential conductivity comprising:
   - a circumferentially wound transmitter coil of one or more turns wound around the workpiece; and
   - a discrete receiver to detect both circumferential and axial local variations in the eddy currents induced in the workpiece by said transmitter coil; and
   - an impedance analyzer to stimulate said transmitter coil and display variations detected by said discrete receiver.

2. A system for inspection by eddy current methods according to claim 1 wherein said receiver is a horseshoe probe.

3. A system for inspection by eddy current methods according to claim 1 wherein said receiver is a Hall probe.

4. A system for inspection by eddy current methods according to claim 1 wherein said receiver is a SQUID.

5. A system according to claim 1 wherein said transmitter coil and said receiver are physically located on the exterior surface of the workpiece.

6. A system according to claim 1 wherein said transmitter coil and said receiver are physically located on the inner surface of the workpiece.

7. A system according to claim 1 wherein said transmitter coil and said receiver are physically located on opposing sides of the workpiece.

8. A system for inspection by eddy current techniques for use on a filament-wound conductive fiber reinforced composite workpiece comprising:
   - a driver coil to induce eddy currents circumferentially in the workpiece; and
   - a discrete receiver to detect the eddy currents induced by said driver coil whereby local anomalies may be detected both circumferentially and axially; and
   - an impedance analyzer to generate an input to said driver coil and display the output of said receiver.

9. A system for inspection by eddy current techniques for use on thick-walled structures exhibiting circumferential conductivity comprising:
   - a driver coil to induce eddy currents circumferentially throughout the thickness of the workpiece; and
   - a discrete receiver to detect the induced eddy currents in the workpiece whereby axial and circumferential resolution of defects can be obtained.

10. A system according to claim 9 wherein said discrete receiver is a horseshoe probe.

* * * * *